US009523760B1

(12) United States Patent
Kravets et al.

(10) Patent No.: US 9,523,760 B1
(45) Date of Patent: Dec. 20, 2016

(54) DETECTING MOTION BASED ON REPEATED WIRELESS TRANSMISSIONS

(71) Applicant: Cognitive Systems Corp., Waterloo (CA)

(72) Inventors: Oleksiy Kravets, Petersburg (CA); Tajinder Manku, Waterloo (CA)

(73) Assignee: Cognitive Systems Corp., Waterloo, Ontario (CA)

( * ) Notice: Subject to any disclaimer, the term of this patent is extended or adjusted under 35 U.S.C. 154(b) by 0 days.

(21) Appl. No.: 15/099,833

(22) Filed: Apr. 15, 2016

(51) Int. Cl.
*G01S 13/04* (2006.01)
*G01S 5/02* (2010.01)
*H04W 4/00* (2009.01)
*H04W 40/24* (2009.01)

(52) U.S. Cl.
CPC ............ *G01S 5/0273* (2013.01); *G01S 5/0252* (2013.01); *H04W 4/005* (2013.01); *H04W 40/244* (2013.01)

(58) Field of Classification Search
CPC .......... G01S 13/04; G01S 13/42; G01S 13/56; G01S 13/878; G08B 13/2491; G08B 21/22
USPC .............. 342/22, 27–28; 340/539.21, 539.23
See application file for complete search history.

(56) References Cited

U.S. PATENT DOCUMENTS

| 4,740,045 A * | 4/1988 | Goodson ................. G01S 7/023 342/112 |
| 5,270,720 A * | 12/1993 | Stove .................... G01S 7/4004 342/114 |
| 5,696,514 A * | 12/1997 | Nathanson ................ G01S 5/06 342/31 |
| 7,295,109 B2 | 11/2007 | Kobayashi |
| 8,138,918 B2 | 3/2012 | Habib et al. |
| 8,836,344 B2 | 9/2014 | Habib et al. |
| 9,143,413 B1 | 9/2015 | Manku et al. |
| 9,143,968 B1 | 9/2015 | Manku et al. |
| 2005/0055568 A1 | 3/2005 | Agrawala et al. |
| 2005/0083199 A1 | 4/2005 | Hall et al. |
| 2008/0303655 A1 | 12/2008 | Johnson |
| 2010/0315284 A1 * | 12/2010 | Trizna ...................... G01S 7/18 342/123 |
| 2012/0146788 A1 | 6/2012 | Wilson et al. |
| 2012/0184296 A1 | 7/2012 | Milosiu et al. |
| 2014/0004874 A1 | 1/2014 | Schwartz et al. |
| 2014/0015706 A1 | 1/2014 | Ishihara et al. |
| 2014/0140231 A1 | 5/2014 | Haiut et al. |

(Continued)

FOREIGN PATENT DOCUMENTS

BS    WO 2014201574 A1 * 12/2014 ............. G01S 13/38

OTHER PUBLICATIONS

Non-Final Office Action received in U.S. Appl. No. 15/151,571, Aug. 5, 2016, 18 pages.

*Primary Examiner* — Timothy A Brainard
(74) *Attorney, Agent, or Firm* — Henry Patent Law Firm PLLC

(57) ABSTRACT

In a general aspect, motion of an object is detected based on wireless signals. In some aspects, wireless signals based on a repeated wireless transmission are received at a wireless sensor device in a space. The received wireless signals are analyzed, by operation of a processor, to detect movement of an object in the space. The analysis includes determining complex values representing the relative phases and amplitudes of respective frequency components of each of the received wireless signals, and detecting movement of an object in the space based on a change in the complex values.

20 Claims, 9 Drawing Sheets

(56) References Cited

U.S. PATENT DOCUMENTS

| | | | |
|---|---|---|---|
| 2014/0247179 A1 | 9/2014 | Furuskog et al. | |
| 2015/0212205 A1* | 7/2015 | Shpater | G01S 13/38 342/28 |
| 2015/0338507 A1* | 11/2015 | Oh | G01S 13/343 342/159 |

* cited by examiner

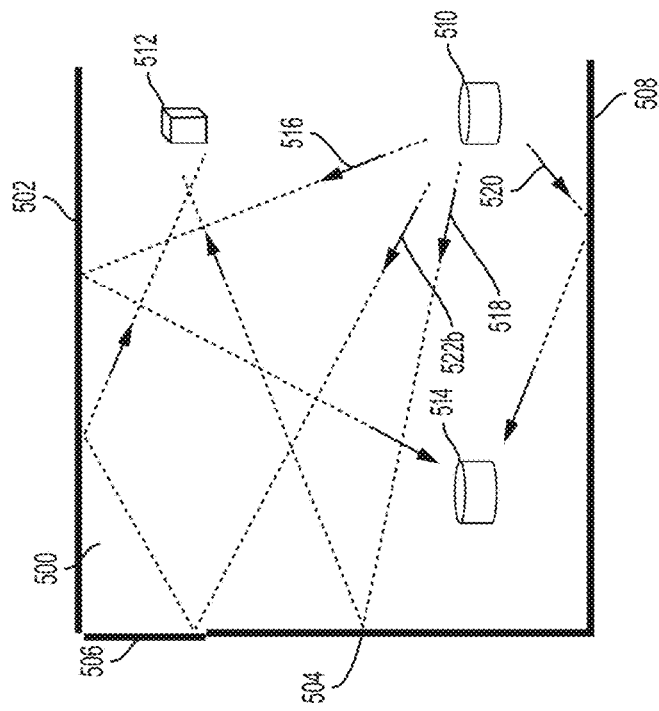
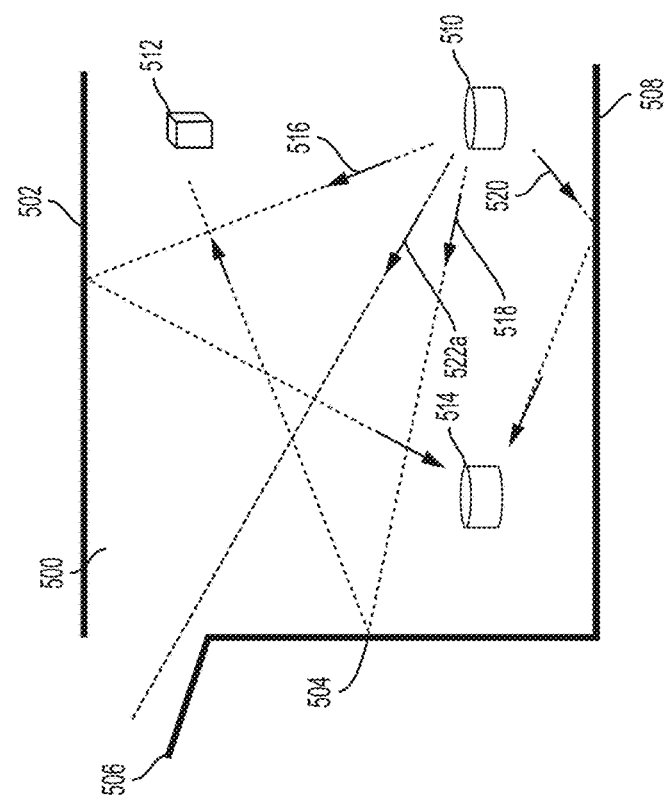

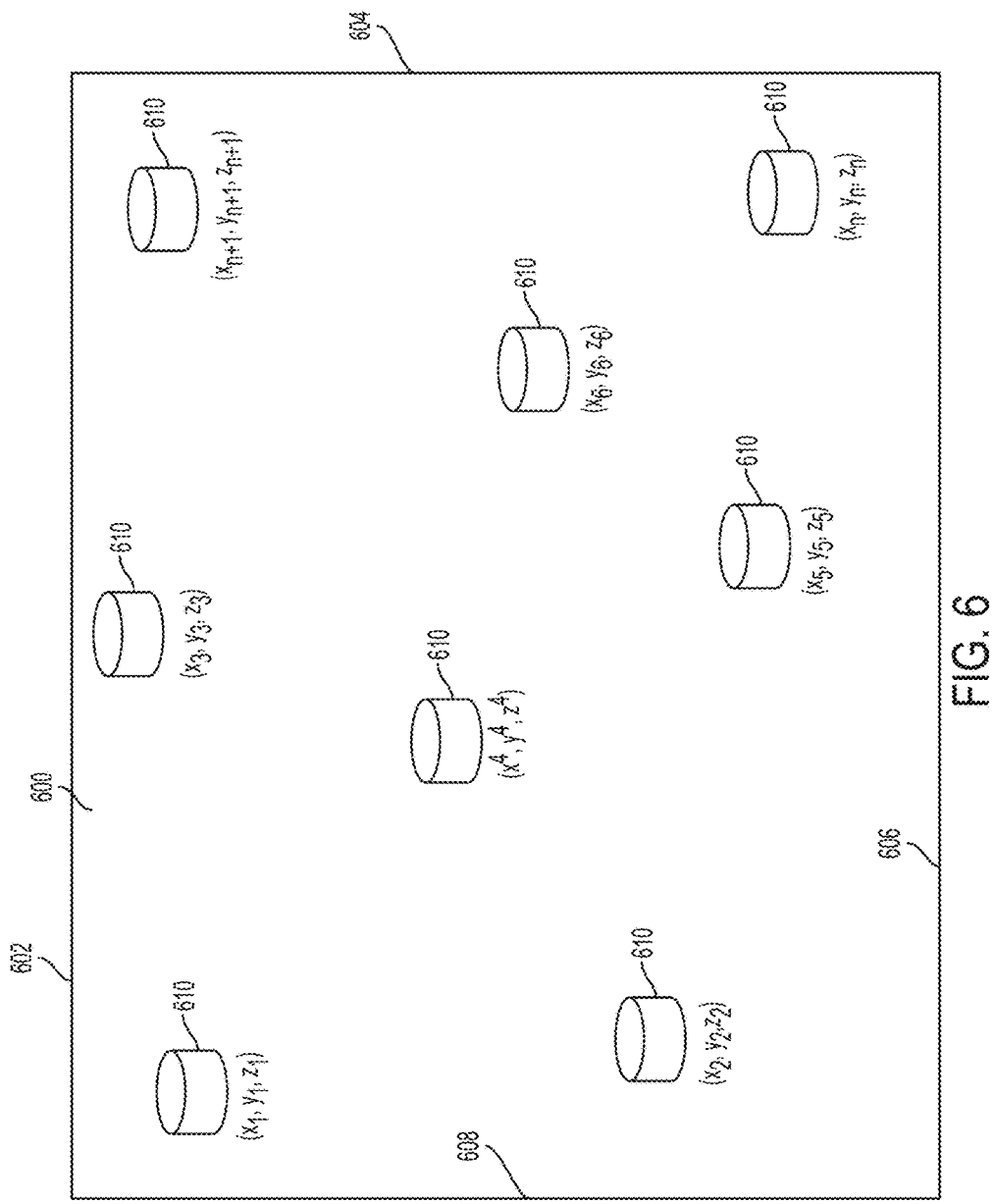

DETECTING MOTION BASED ON REPEATED WIRELESS TRANSMISSIONS

BACKGROUND

The following description relates to detecting motion, for example, based on repeated wireless transmissions.

Motion detection systems have been used to detect movement, for example, of objects in a room or an outdoor area. In some example motion detection systems, infrared or optical sensors are used to detect movement of objects in the sensor's field of view. Motion detection systems have been used in security systems, automated control systems and other types of systems.

DESCRIPTION OF DRAWINGS

FIGS. 5A and 5B are diagrams showing signals transmitted in another space that includes an example motion detection system.

FIG. 6 is a diagram showing an example space that includes multiple sensor devices.

DETAILED DESCRIPTION

In some aspects of what is described, motion of an object is detected based on repeated transmissions of a wireless signal. A motion detection system may include one or more sensor devices, source devices and other components. In some example implementations, motion is detected based on signals (e.g., Bluetooth Beacons, Wi-Fi Beacons, other wireless beacon signals or other types of signals) that are generated by another system. In some examples, a wireless signal may propagate through an object (e.g., a wall) before or after interacting with a moving object, which may allow the object's movement to be detected without an optical line-of-sight between the moving object and the sensor device. Motion detector systems may be used in larger systems, such as a security system, that may include a control center for monitoring movement within a space, such as a room, building, etc.

Figure 1:
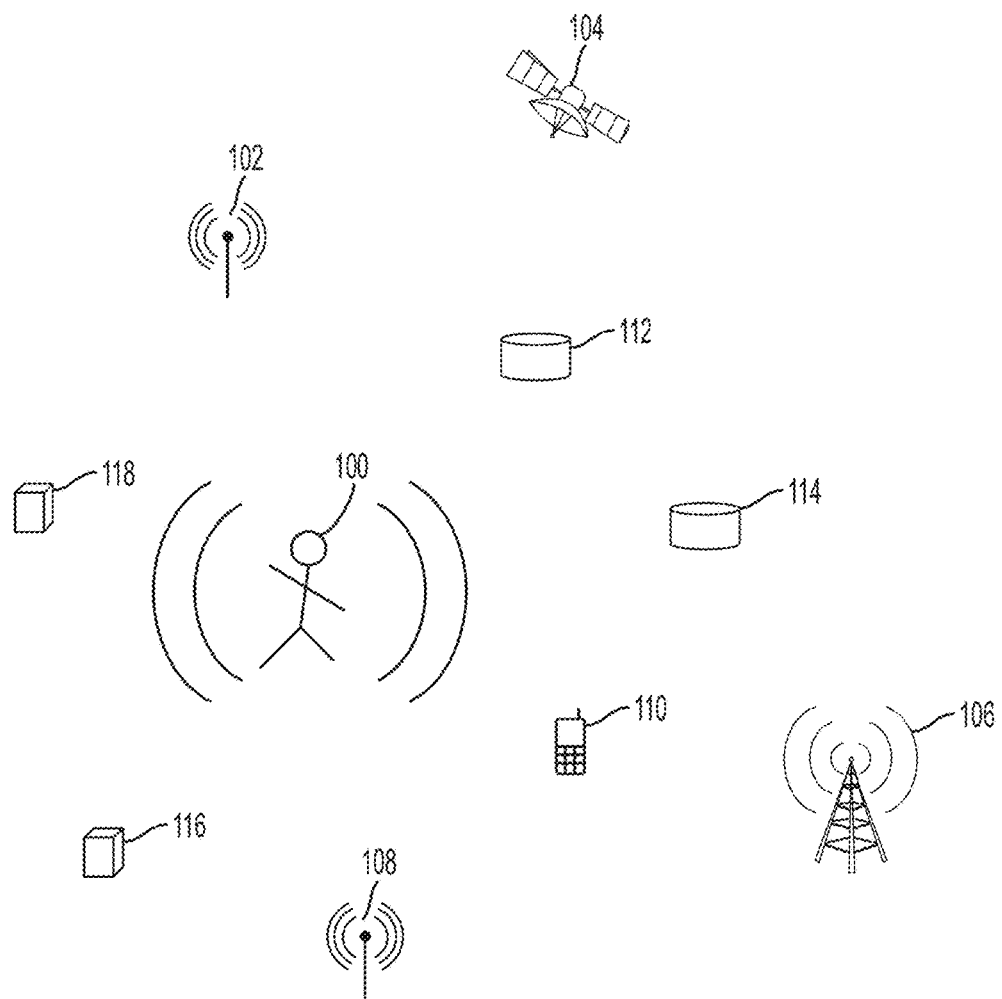
FIG. 1 is a diagram showing an environment with example motion detection system.

FIG. 1 is a diagram showing an environment with example motion detection system. In the example shown, source devices can transmit wireless signals in the radio spectrum. The example source devices shown in FIG. 1 include a Bluetooth source 102, a satellite source 104, a base station source 106, a Wi-Fi source 108, and a cellular phone source 110. In some examples, a laptop computer or tablet may include a Bluetooth source 102, and may communicate with various devices near the laptop computer or tablet, such as a mouse, a headset, etc. A satellite source 104 may transmit, for example, signals for a Global Positioning System (GPS). In some examples, a base station source 106 can provide signals to connect mobile devices to a telephony network, to connect computing devices to a data network, etc. In some examples, a Wireless Access Point (WAP) for a network may operate as a Wi-Fi source 108, which can allow computing devices, such as computers, tablets, smartphones, etc., to connect to a communications network. In some examples, a cellular phone can include one or more cellular phone sources 110 that transmit signals for Bluetooth or NFC systems, for Wi-Fi or cellular networks, or for other types of systems. Other source devices may be used.

In the example environment shown in FIG. 1, example sensor devices are illustrated in various locations. FIG. 1 illustrates a first sensor device 112, a second sensor device 114, a third sensor device 116, and a fourth sensor device 118. A different number of sensor devices may be used. For example, a single sensor device may be used in some cases, or a large number (e.g., tens, hundreds, etc.) of sensor devices may be used.

The example sensor devices 112, 114, 116, and 118 shown in FIG. 1 are adapted to receive and analyze signals from one or more of the example source devices. The example sensor devices may receive signals through a communication channel, and the signal that is received can be used to detect movement of an object 100 (e.g., a person, a structure, a device, etc.) in the communication channel. An example sensor device is described with reference to FIGS. 7, 8 and 9. In some examples, a single device may operate as a source device and a sensor device at different times.

A communication channel for a wireless signal can include, for example, air or any other medium through which the wireless electromagnetic signal propagates. A communication channel can include multiple paths for a transmitted wireless electromagnetic signal. For a given communication channel (or a given path in a communication channel), the transmitted signal can be reflected off of or scattered by a surface in the communication channel. Reflection or scattering may occur as a result of the transmitted signal being incident upon an impedance discontinuity, which may occur at a boundary between distinct materials, such as a boundary between air and a wall, a boundary between air and a person, or other boundaries. In some instances, when a transmitted signal becomes incident upon a boundary between a first material (in this example, air) and a second material (in this example, a wall), a portion of the transmitted signal can be reflected or scattered at the boundary between the air and the wall. Additionally, another portion of the transmitted signal may continue to propagate through the wall, it may be refracted or affected in another manner. Further, the other portion that propagates through the wall may be incident upon another boundary, and a further portion may be reflected or scattered at that boundary and another portion may continue to propagate through the boundary.

At a sensor device, signals that propagate along the multiple paths of the communication channel can combine to form a received signal. Each of the multiple paths can result in a signal along the respective path having an attenuation and a phase offset relative to the transmitted signal due to the path length, reflectance or scattering of the signal, or other factors. Hence, the received signal at the sensor device can have different components that have different attenuations and phase offsets relative to the transmitted signal. When an object that reflects or scatters a signal in a path moves, a component of the received signal at the sensor device can change. For example, a path length can change resulting in a smaller or greater phase offset and resulting in more or less attenuation of the signal. Hence, the change caused by the movement of the object can be detected in the received signal.

Figure 2A:
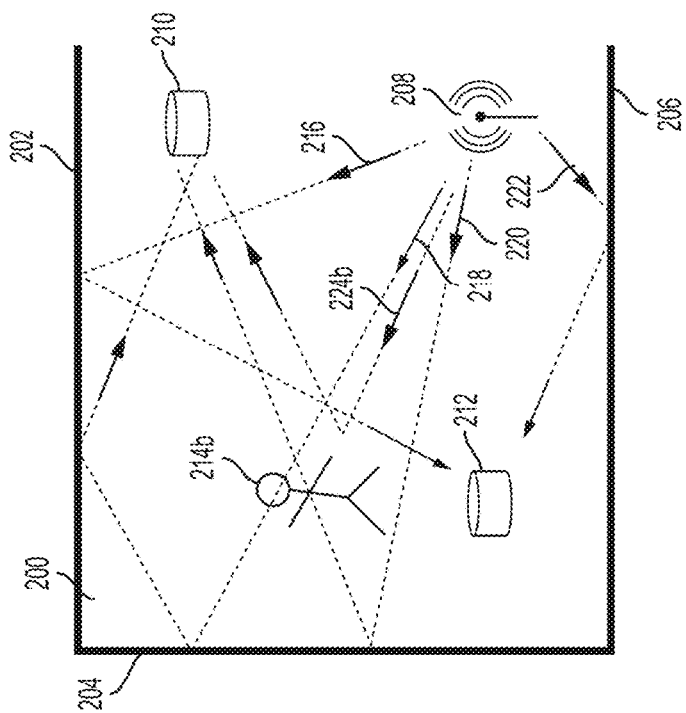
FIGS. 2A and 2B are diagrams showing signals transmitted in a space that includes an example motion detection system.
Figure 2B:
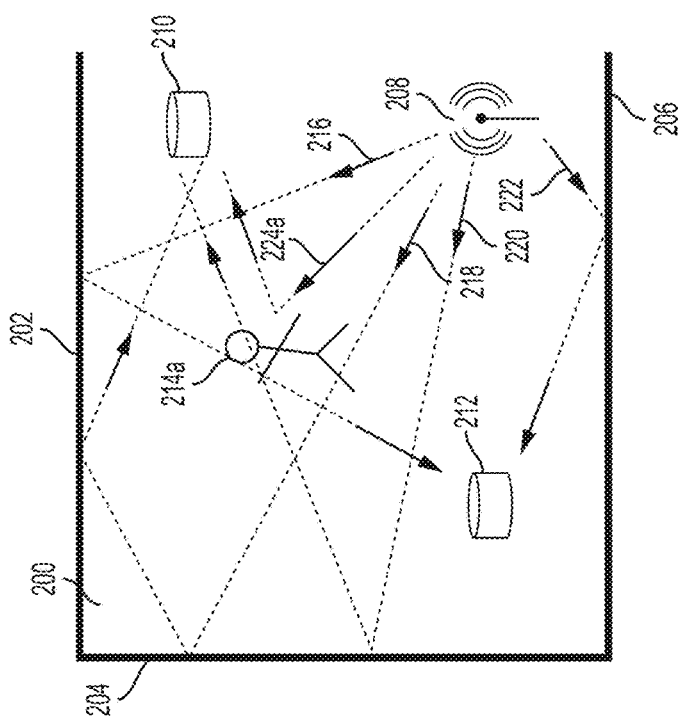

FIGS. 2A and 2B are diagrams showing signals transmitted in a space 200 that includes an example motion detection system. The example space 200 can be completely or partially enclosed or open at one or more boundaries of the space. The space 200 can be or can include an interior of a room, multiple rooms, a building, or the like. A first wall 202, a second wall 204, and a third wall 206 at least partially enclose the space 200 in the example shown.

The example motion detection system includes a source device 208, a first sensor device 210 and a second sensor device 212 in the space 200. The source device 208 is operable to transmit a transmitted wireless signal (e.g., an RF wireless signal) repeatedly (e.g., periodically, intermittently, at random intervals, etc.). The sensor devices 210, 212 are operable to received wireless signals (e.g., RF wireless signals) based on the transmitted wireless signal. The sensor devices 210, 212 each have a processor that is configured to determine characteristics (e.g., relative phase and magnitude) of frequency components of respective signals based on the received wireless signals. The sensor devices 210, 212 each have a processor that is configured to detect motion of an object based on a comparison of the characteristics of the frequency components. In some examples, a single processor or multiple processors may be used, for example, as discussed with respect to FIGS. 8 and 9.

As shown, an object is in a first position 214a in FIG. 2A, and the object has moved to a second position 214b in FIG. 2B. In FIGS. 2A and 2B, the moving object in the space 200 is represented as a human, but the moving object can be another type of object. For example, the moving object can be an animal, an inorganic object (e.g., a system, device, apparatus or assembly), or object that defines all or part of the boundary of the space 200 (e.g., a wall, door, window, etc.), or another type of object.

As shown in FIGS. 2A and 2B, multiple example paths of a wireless signal transmitted from the source device 208 are illustrated by dashed lines. Along a first signal path 216, the wireless signal is transmitted from the source device 208 and reflected off the first wall 202 toward the second sensor device 212. Along a second signal path 218, the wireless signal is transmitted from the source device 208 and reflected off the second wall 204 and the first wall 202 toward the first sensor device 210. Along a third signal path 220, the wireless signal is transmitted from the source device 208 along a third path and reflected off the second wall 204 toward the first sensor device 210. Along a fourth signal path 222, the wireless signal is transmitted from the source device 208 and reflected off the third wall 206 toward the second sensor device 212.

In FIG. 2A, along a fifth signal path 224a, the wireless signal is transmitted from the source device 208 and reflected off the object at the first position 214a toward the first sensor device 210. Between FIGS. 2A and 2B, a surface of the object moves from the first position 214a to a second position 214b in the space 200 some distance away from the first position 214a. In FIG. 2B, along a sixth signal path 224b, the wireless siganl is transmitted from the source device 208 and reflected off the object at the second position 214b toward the first sensor device 210. The sixth signal path 224b depicted in FIG. 2B is longer than the fifth signal path 224a depicted in FIG. 2A due to the movement of the object from the first position 214a to the second position 214b. In some examples, a path to a sensor can be added, removed or otherwise modified due to movement of an object in a space.

The example signals shown in FIGS. 2A and 2B may experience attenuation, frequency shifts, phase shifts or other effects through their respective paths and may have portions that propagate in another direction, for example, through the walls 202, 204, and 206. In some examples, the signals are radio frequency (RF) signals; or the signals may include other types of signals.

As shown in FIGS. 2A and 2B, the source device 208 repeatedly transmits a signal. In particular, FIG. 2A shows the signal being transmitted from the source device 208 at a first time, and FIG. 2B shows the same signal being transmitted from the source device 208 at a second, later time. The transmitted signal can be transmitted continuously, periodically, at random or intermittent times or the like, or a combination thereof. The transmitted signal can have a number of frequency components in a frequency bandwidth. The transmitted signal can be transmitted from the source device 208 in an omnidirectional manner, in a directional manner or otherwise. In the example shown, the signals traverse multiple respective paths in the space 200, and the signal along each path may become attenuated due to path losses, scattering, reflection, or the like and may have a phase or frequency offset.

As shown in FIGS. 2A and 2B, the signals from various paths 216, 218, 220, 222, 224a, and 224b combine at the first sensor device 210 and the second sensor device 212 to form received signals. Because of the effects of the multiple paths in the space 200 (an example communication channel) on the transmitted signal, the space 200 may be represented as a transfer function (e.g., a filter) in which the transmitted signal is input and the received signal is output. When an object moves in the space 200, the attenuation or phase offset affected upon a signal in a signal path can change, and hence, the transfer function of the space 200 can change. Assuming the same transmitted signal is transmitted from the source device 208, if the transfer function of the space 200 changes, the output of that transfer function—the received signal—will also change. A change in the received signal can be used to detect movement of an object.

Mathematically, a transmitted signal f(t) transmitted from the source device 208 may be described according to Equation (1):

$$f(t) = \sum_{n=-\infty}^{\infty} c_n e^{j\omega_n t} \tag{1}$$

where $\omega_n$ represents the frequency of $n^{th}$ frequency component of the transmitted signal, $c_n$ represents the complex coefficient of the $n^{th}$ frequency component, and t represents time. With the transmitted signal f(t) being transmitted from the source device 208, an output signal $r_k(t)$ from a path k may be described according to Equation (2):

$$r_k(t) = \sum_{n=-\infty}^{\infty} \alpha_{n,k} c_n e^{j(\omega_n t + \phi_{n,k})} \tag{2}$$

where $\alpha_{n,k}$ represents an attenuation factor (e.g., due to scattering, reflection, and path losses) for the $n^{th}$ frequency component along path k, and $\phi_{n,k}$ represents the phase of the signal for $n^{th}$ frequency component along path k. Then, the received signal R at a sensor device can be described as the summation of all output signals $r_k(t)$ from all paths to the sensor device, which is shown in Equation (3):

$$R = \sum_k r_k(t) \quad (3)$$

Substituting Equation (2) into Equation (3) renders the following Equation (4):

$$R = \sum_k \sum_{n=-\infty}^{\infty} (\alpha_{n,k} e^{j\phi_{n,k}}) c_n e^{j\omega_n t} \quad (4)$$

The received signal R at a sensor device can then be analyzed. The received signal R at a sensor device can be transformed to the frequency domain, for example, using a Fast Fourier Transform (FFT) or another type of algorithm. The transformed signal can represent the received signal R as a series of n complex values, one for each of the respective frequency components (at the n frequencies $\omega_n$). For a frequency component at frequency $\omega_n$, a complex number $Y_n$ may be represented as follows in Equation (5):

$$Y_n = \sum_k c_n \alpha_{n,k} e^{j\phi_{n,k}} \quad (5)$$

The complex value $Y_n$ for a given frequency component $\omega_n$ indicates a relative magnitude and phase offset of the received signal at that frequency component $\omega_n$.

With the source device 208 repeatedly (e.g., at least twice) transmitting the transmitted signal f(t) and a respective sensor device 210 and 212 receiving and analyzing a respective received signal R, the respective sensor device 210 and 212 can determine when a change in a complex value $Y_n$ (e.g., a magnitude or phase) for a given frequency component $\omega_n$ occurs that is indicative of movement of an object within the space 200. For example, a change in a complex value $Y_n$ for a given frequency component $\omega_n$ may exceed a predefined threshold to indicate movement. In some examples, small changes in one or more complex values $Y_n$ may not be statistically significant, but may only be indicative of noise or other effects.

In some examples, transmitted and received signals are in an RF spectrum, and signals are analyzed in a baseband bandwidth. For example, a transmitted signal may include a baseband signal that has been up-converted to define a transmitted RF signal, and a received signal may include a received RF signal that has been down-converted to a baseband signal. Because the received baseband signal is embedded in the received RF signal, effects of movement in the space (e.g., a change in a transfer function of the communication channel) may occur on the received baseband signal, and the baseband signal may be the signal that is analyzed (e.g., using a Fourier analysis or another type of analysis) to detect movement. In other examples, the analyzed signal may be an RF signal or another signal.

Figure 3:
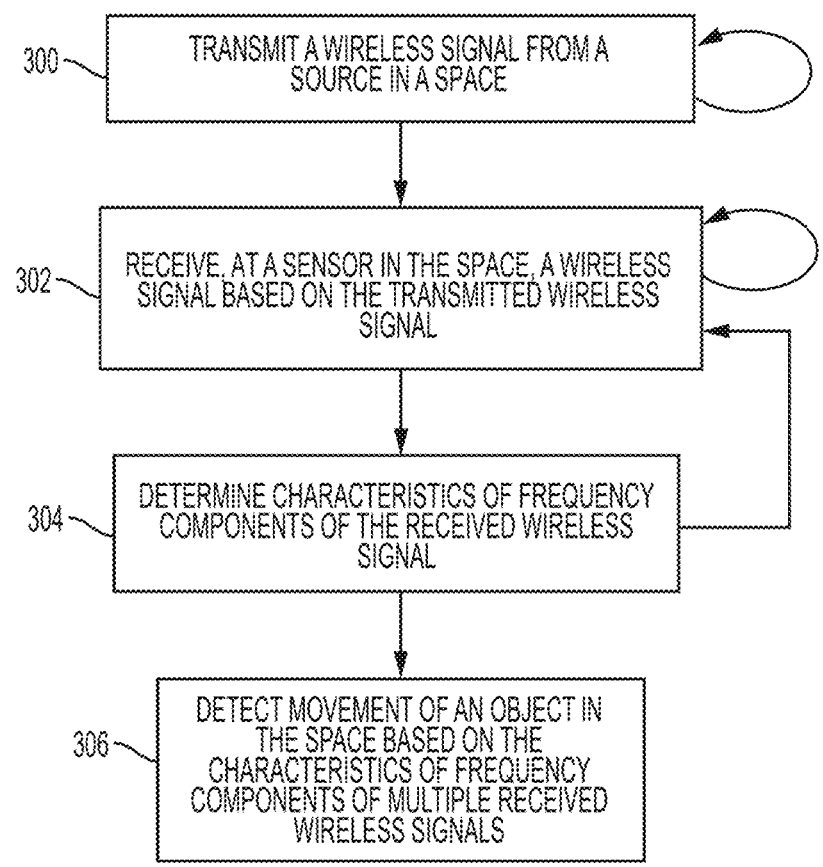
FIG. 3 is a flowchart showing an example process for detecting movement.

FIG. 3 is a flowchart showing an example process for detecting movement in a space. The example process shown in FIG. 3 may include additional or different operations, and the operations can be performed in the order shown or in another order. In some implementations, the process shown in FIG. 3 can be performed by a motion detection system such as, for example, the motion detection systems shown in FIGS. 2A and 2B. In some implementations, the process shown in FIG. 3 can be performed by another type of system that includes similar or different components.

At 300, a wireless signal is transmitted from a source, which produces a transmitted wireless signal in a space. The transmission is performed repeatedly. Referring back to FIGS. 2A and 2B, for example, the source device 208 can repeatedly send a transmitted wireless signal. In some implementations, the transmission can be a beacon signal that is repeatedly sent by a Bluetooth device, a Wi-Fi router, or another type of device. The repeated transmissions can be sent at scheduled times, at periodic or random intervals or in other time steps. In some cases, the transmitted wireless signal is multiple times per second, per minute, per hour, etc.

At 302, a wireless signal is received at a sensor in the space; the received wireless signal is based on the transmission of the transmitted wireless signal. As shown in FIG. 3, wireless signals can be received repeatedly, such that, for example, a signal can be received at 302 for each transmission at 300. Referring back to the example shown in FIGS. 2A and 2B, the first sensor device 210 repeatedly receives a wireless signal—at a first time in FIG. 2A, and at a second time in FIG. 2B.

At 304, characteristics of frequency components of the received wireless signal are determined. As discussed above in the example of FIGS. 2A and 2B, the received signals can be transformed (e.g., Fourier transformed) to the frequency domain to determine complex values representing the frequency components in a bandwidth of the signal. For example, the spectrum analysis engine 960 in FIG. 9, the central processing unit (CPU) 840 in FIG. 8 or another type of processor may be configured to identify frequency components. The analysis can be performed for each of the received wireless signals.

At 306, movement of an object in the space is detected based on the characteristics of the frequency components of multiple received wireless signals. For example, in the example of FIGS. 2A and 2B, when a complex value representing a magnitude and phase of a frequency component of a received signal changes by an amount that exceeds a threshold value, movement can be detected. For example, the spectrum analysis engine 960 in FIG. 9, the central processing unit (CPU) 840 in FIG. 8 or another type of processor may be configured to detect movement.

In an example implementation of the process shown in FIG. 3, at a first time $t_1$, the source device 208 sends a first transmission $T_1$ of a signal S; the first sensor device 210 then receives a first wireless signal $R_1$ based on the first transmission $T_1$. At a second, later time $t_2$, the source device 208 sends a second transmission $T_2$ of the same signal S; the first sensor device 210 then receives a second wireless signal $R_2$ based on the second transmission $T_2$. In this example, the first and second transmissions ($T_1$ and $T_2$) from the source device 208 are the same wireless signal (S=f(t)), transmitted at different times. The received wireless signals ($R_1$ and $R_2$) may be the same or different. For example, when there is no movement of objects in the path traversed by the first and second transmissions ($T_1$ and $T_2$) between the transmission times ($t_1$ and $t_2$), the received wireless signals ($R_1$ and $R_2$) are the same; whereas movement of an object in a path between the transmission times ($t_1$ and $t_2$) may cause a difference in the received wireless signals ($R_1$ and $R_2$). Accordingly, the sensor device 210 can detect movement of objects along any signal path between the source device 208 and the sensor device 210 based on a comparison between the received wireless signals ($R_1$ and $R_2$).

Figure 4:
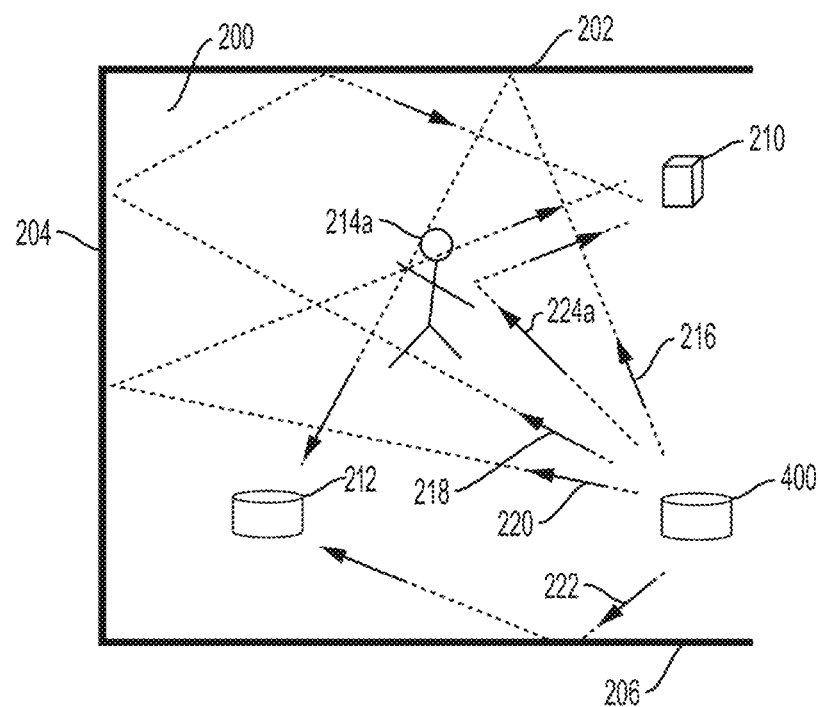
FIG. 4 is a diagram showing signals transmitted in a space that includes an example motion detection system.

FIG. 4 is a diagram showing a signal transmitted in a space that includes an example motion detection system. Much of the environment and the components of FIG. 4 are the same as or similar to the environment and the components of FIGS. 2A and 2B. In FIG. 4, the motion detection system includes a device 400 that can operate as both a source device and a sensor device. In FIG. 4, the device 400 can repeatedly transmit a transmitted signal or repeatedly receive and analyze a received signal, for example, in the manner discussed above with respect to FIGS. 2A and 2B. The device 400 is capable of detecting movement of an object in the space 200 based on the analysis of received signals. In the example shown, the device 400 operates as a source device, and the sensor devices 210 and 212 receive wireless signals based on transmissions from the device 400. At other instances, the same device 400 may operate as a sensor device and receive wireless signals based on transmissions from another source device.

FIGS. 5A and 5B are diagrams showing signals transmitted in another space that includes an example motion detection system. The example space 500 can be completely or partially enclosed or open at one or more boundaries of the space. The space 500 can be or can include an interior of a room, multiple rooms, a building, or the like. A first wall 502, a second wall 504, and a third wall 508 at least partially enclose the space 500 in this example. In the example shown, the second wall 504 includes a door 506.

The example motion detection system includes a source device 510, a first sensor device 512 and a second sensor device 514 in the space 500. As shown in FIGS. 5A and 5B, multiple example paths of a wireless signal transmitted from the source device 510 are illustrated by dashed lines. Along a first signal path 516, a wireless signal is transmitted from the source device 510 and reflected off the first wall 502 toward the second sensor device 514. Along a second signal path 518, the wireless signal is transmitted from the source device 510 and reflected of the second wall 504 toward the first sensor device 512. Along a third signal path 520, the wireless signal is transmitted from the source device 510 and reflected off the third wall 508 toward the second sensor device 514.

As shown in FIG. 5A, the door 506 in the second wall 504 is open, and the wireless signal along a fourth signal path 522a is transmitted from the source device 510 through the open door 506. In FIG. 5A, there is no surface at the boundary of the space 500 to reflect the signal along the fourth signal path 522a. In FIG. 5B, the door 506 in the second wall 504 has moved to a shut position, and the signal along a fifth signal path 522b is transmitted from the source device 510 and reflected off the shut door 506 toward the first sensor device 512. The door 506 closing causes the signal path to change during the time between the first and second transmissions of the wireless signal from the source device 510, which causes a corresponding change in the received signal at the first sensor device 512. The change in the received signal can be identified by the sensor device 512 to detect the motion of the door 506, for example, according to the process shown in FIG. 3 or in another manner.

Additionally, repetitive movements may be learned and catalogued by a sensor device. As in FIGS. 5A and 5B, a door opening and closing provides an example of a repetitive movement that can be learned and catalogued. In some cases, a movement in a space has an identifiable type of effect on a signal received at a sensor device. For example, assuming no other movement in a space, a repeated movement may cause the received signal to change in the same manner each instance the movement occurs. The characteristic change in the received signal can be identified to detect an instance of the repeated movement. A signature for a repetitive movement may be saved in memory in a sensor device so that the signature can be compared against detected signal changes, for example, to identify the nature of a detected movement. In some cases, this can provide more information to a person or system reviewing information about the movement detection. Noise or other effects may reduce the ability to detect a change in some cases.

FIG. 6 is a diagram showing an example space 600 that includes multiple sensor devices 610. The environment in FIG. 6 can represent the example environments of FIGS. 2A, 2B, 4, 5A and 5B, or another environment. The example space 600 in FIG. 6 is a room defined, at least in part by a first wall 602, a second wall 604, a third wall 606, and a fourth wall 608. Another implementation may have another configuration for a space 600, which may be a room, multiple rooms, a building, or the like. As shown in FIG. 6, each sensor device 610 has a spatial location ($x_i$, $y_i$, $z_i$) and can monitor and analyze a received signal at its respective spatial location ($x_i$, $y_i$, $z_i$).

Additionally, in some example implementations, each sensor device can transmit information (e.g., characteristics of a received signal, an indication of detection of motion, an identification of the detected motion, time of the detected motion, sensor device 610 identification or location information, or the like) to a data aggregation system (e.g., as discussed below in FIG. 7). For example, the location and time information can include spatial coordinates of the sensor device (e.g., ($x_i$, $y_i$, $z_i$) or in other coordinates) and temporal coordinates (e.g., a time of day) at which motion is detected. The example environment in FIG. 6 shows the spatial coordinates of the sensor devices 610 and serves as a map of the example spatial distribution of the sensor devices in the space 600.

Figure 7:
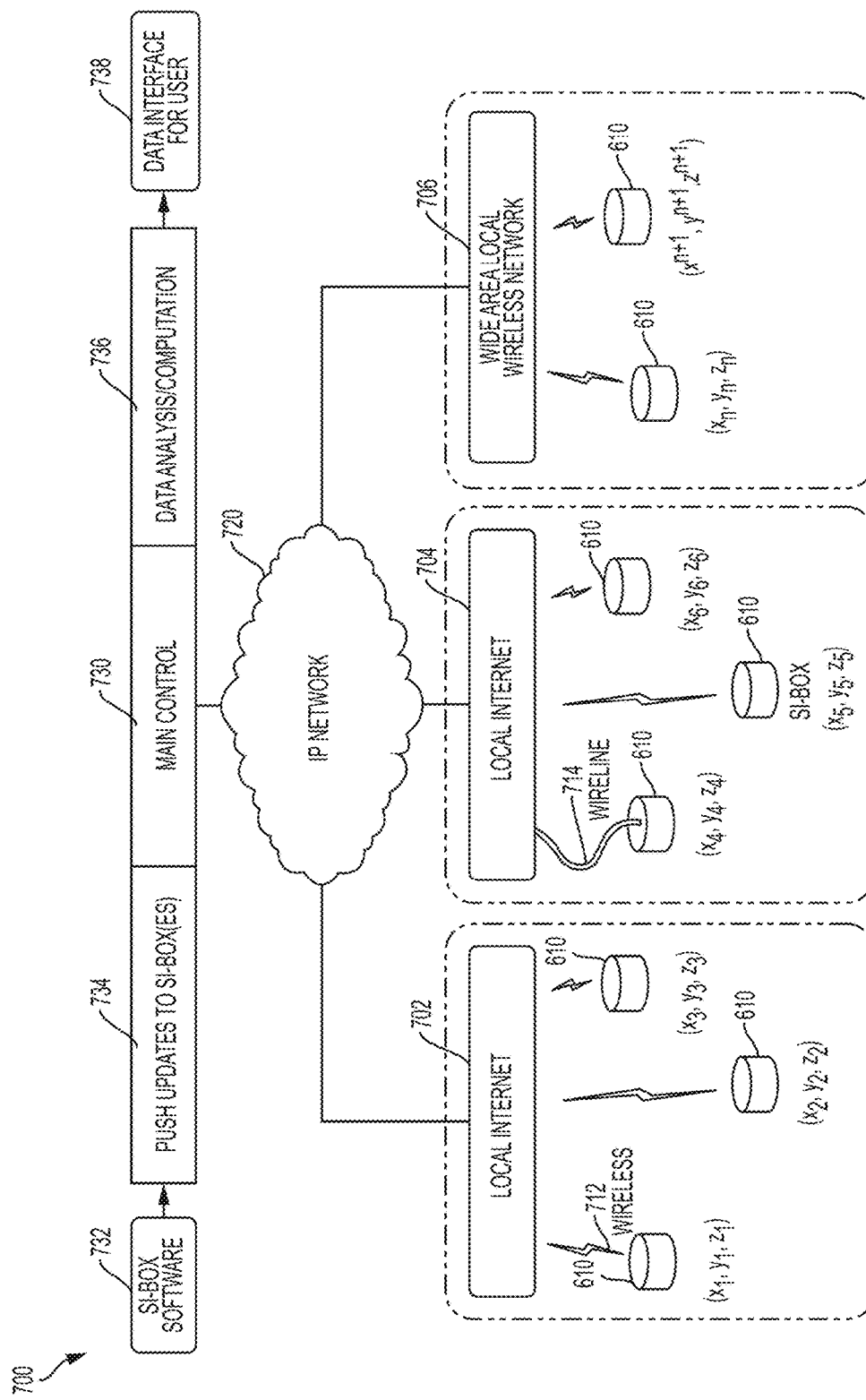
FIG. 7 is a block diagram showing an architecture of an example motion detection system.

FIG. 7 is a block diagram showing an architecture of an example motion detection system 700. The motion detection system 700 can be implemented with the sensor devices or source devices in the example environments of FIGS. 2A, 2B, 4, 5A, 5B, or another environment. The example motion detection system 700 includes sensor devices and one or more source devices. The sensor devices 610 are shown in the example motion detection system 700 of FIG. 7. The example motion detection system 700 further includes an IP network 720 and a main controller 730. The motion detection system 700 can include additional or different components. In some implementations, a motion detection system can be arranged as shown in FIG. 7 or in another manner.

In the example shown in FIG. 7, each sensor device 610 is at a respective physical location having spatial coordinates ($x_i$, $y_i$, $z_i$), where i varies from 1 to n+1 (n+1 being the number of the sensor devices 610). In some implementations, each sensor device 610 can include a Global Positioning System (GPS) or another location identification system that identifies the location coordinates of the sensor device 610, or the location coordinates can be identified in another manner. In some implementations, each sensor device 610 has a unique identifier, and the identifier can be associated with a location identifier or location coordinates.

The example sensor devices can receive respective signals that the sensor devices analyze for changes. Some changes, e.g., statistically significant changes, in a received signal can be indicative of movement in a space. For instance, the sensor device can detect an RF signal in a local wireless environment about the location of the sensor device at any given time. The RF signal can be in any bandwidth and may cover any portion of the radio spectrum.

In the example shown in FIG. 7, data from the sensor devices (e.g., movement indications, location information, etc.) are aggregated by a data aggregation or central control system (e.g., the main controller 730). In some implementations, data from the sensor devices are aggregated by the main controller 730 by receiving the messages transmitted from the sensor devices, for example, through the IP network (e.g., the IP network 720). In some implementations, the sensor devices are connected to the IP network 720 via a local network (e.g., a local internet 702 or 704). The sensor devices can be connected to the local network by a local wireline network 714 or a wireless network 712. The wireline network 714 can include, for example, Ethernet, xDSL (x-digital subscriber line), optical network, or other types of wireline communication networks. The wireless network 712 can include, for example, WiFi, Bluetooth, near field communication (NFC), or other types of local wireless networks. In some implementations, some of the sensor devices are connected directly to the IP network 720 using one or more wide area networks 706. The wide area networks 706 can include, for example, cellular network, satellite network, or other types of wide area networks.

The main controller 730 can be a computing system that includes one or more computing devices or systems. The main controller 730 or any of its components can be located at a data processing center, a computing facility, or another location. In the example shown, the main controller 730 can remotely control and monitor operation of the sensor devices. Example functions of the main controller 730 can include aggregating the information from some or all of the sensor devices, upgrading the sensor device software, monitoring states of the sensor devices, etc. For example, the main controller 730 can send software updates to some or all sensor devices.

In the example shown in FIG. 7, the main controller 730 can put the sensor devices into one or more calibration or test modes, reset various elements within the sensor devices, or configure an individual sensor device, for example, based on the location or state of the sensor device, its neighboring sensor devices, or other factors. In some examples, the states of an sensor device can include: (i) the temperature of the sensor device, (ii) the current power consumption of the sensor device, (iii) the data rate flowing from the sensor device back to the main controller 730, (iv) the location of the sensor device (e.g., detected an internal GPS unit in the sensor device), (v) a signal (e.g., IP packets, control signaling transmitted over the network) that provides information on the state of the sensor device or its surrounding sensor devices. The main controller 730 may monitor additional or different states of the sensor devices.

In some implementations, the main controller 730 can include or be coupled to a communication system that receives information related to movement detection (e.g., indication of movement detection, movement signature, detected changes in complex values representing magnitudes and phases of frequency components, spatial and temporal coordinates for each of the sensor devices, etc.) transmitted from the sensor devices. The main controller 730 can include or be coupled to a data analysis system 736 that can aggregate (e.g., assemble, compile or otherwise manage) the information related to movement detection from the multiple sensor devices and generate an incident report for, e.g., when movement is detected, such as for an investigation into the cause of the movement.

In some instances, the incident report can be presented on a data interface 738 to present users the indication of movement or other information from the sensor devices relative to the various locations of the sensor devices. For example, the incident report can indicate detected movements based on time and location or other information, which may be helpful to determine a source of movement. In some implementations, the data analysis system 736 can analyze real-time data, historical data, or a combination of both, and determine when movement occurs at a location. Accordingly, the main controller 730 may be used as a control center of a security system, where personnel are able to be alerted to detected movement and to dispatch security or police in response to the alert.

Figure 8:
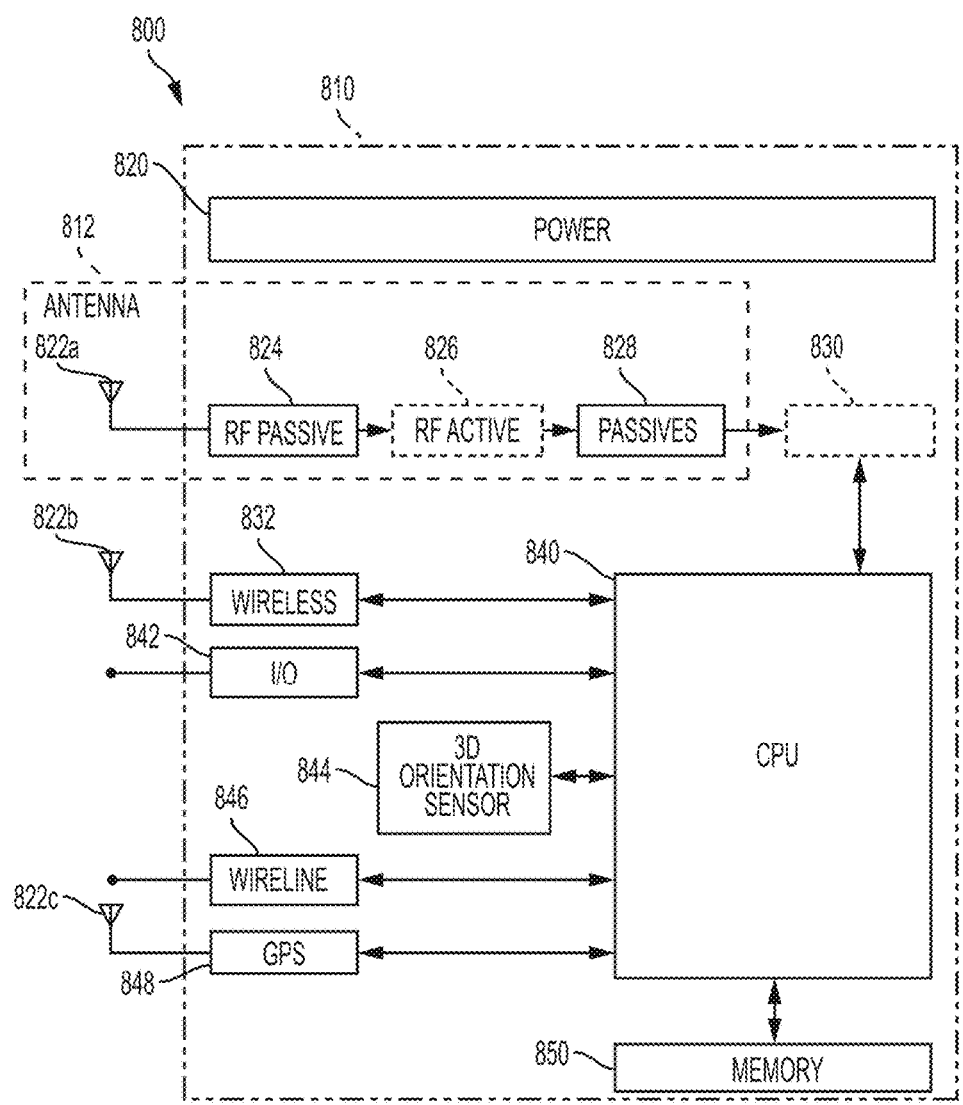
FIG. 8 is a block diagram showing an example sensor device.

FIG. 8 is a block diagram showing an example sensor device 800. In some cases, the sensor devices of FIGS. 2A, 2B, 4, 5A, 5B, 6 and 7 can be implemented as the example sensor device 800 shown in FIG. 8. The example sensor device 800 includes a housing 810, an RF interface 812, a power management subsystem 820, a signal analysis subsystem (e.g., the SI subsystem 830, etc.), a CPU 840, a memory 850, communication interfaces, an input/output interface 842 (e.g., a USB connection), a GPS interface 848, and one or more sensors (e.g., 3D orientation sensors 844 such as a compass or gyroscope, temperature sensors, etc.). The sensor device 800 can include additional or different components and features, and the features of the sensor device can be arranged as shown in FIG. 8 or in another suitable configuration.

In some implementations, the housing 810 can be a portable housing that houses the RF interface 812, the power management subsystem 820, the signal analysis subsystem, the communication interfaces, and other components of the sensor device 800. The housing can be made of plastic, metal, composites, or a combination of these and other materials. The housing can include components that are manufactured by molding, machining, extruding, or other types of processes. In some implementations, the sensor device 800 can be coupled to or integrated with another device (e.g., a WiFi access point or base station, a router, a thermostat, etc.). For example, the housing 810 of the sensor device 800 can be attached to, incorporated, or otherwise coupled to the other device. Alternatively, the housing 810 can be a dedicated housing that houses only the components of the sensor device 800.

In some implementations, the design and arrangement of the housing 810 and components inside the housing 810 can be optimized or otherwise configured for monitoring and receiving wireless signals. For example, the sizes, orientations, and relative locations of the components can be optimized for detecting and analyzing wireless signals, and the device can be compact while accommodating all the necessary components. In some instances, the housing 810 can be on the order of, for example, 10×10×4 cm$^3$; or another size housing can be used.

In some implementations, the RF interface 812 is configured to detect RF signals in multiple bandwidths of an RF spectrum in a local wireless environment about the sensor device 800. The RF interface 812 can include an antenna system and multiple radio paths that are configured to process RF signals in the respective bandwidths. In the example shown in FIG. 8, the RF interface 812 includes an antenna 822a, RF passive elements 824, RF active elements 826, and passive elements 828. The RF passive elements 824 can include, for example, matching elements, RF switches, and filters. The RF active elements 826 can include, for example, RF amplifiers. The passive elements 828 after the RF active elements 826 can include, for example, filters, matching elements, switches, and baluns.

In some examples, the signal analysis subsystem can be configured to detect movement based on the RF signals. A signal analysis subsystem can include radio(s) digital signal processor (DSP), memory, and other components for extracting, e.g., complex values for the frequency components of a wireless signal, and for detecting movement. In some implementations, the combination of the RF interface 812 and the signal analysis subsystem can be referred to as a spectrum inspection (SI) signal path, which is described in greater detail with respect to FIG. 9.

The communication interfaces of the sensor device 800 can be configured to transmit the movement indication or other information to a remote system (e.g., the main controller 730 of FIG. 7). The communication interfaces can include one or more wireless interfaces 832 (e.g., a WiFi connection, cellular connection, etc.), a wireline interface 846 to a local network (e.g., an Ethernet connection, xDSL connection, etc.) or other types of communication links or channels. The communication interfaces can share and reuse the common antennas (e.g., using an antenna array) or they can each have distinct and dedicated antennas.

The wireless interface 832 and the wireline interface 846 can each include a modem to communicate with the local or wide area network. For example, the wireless interface 832 and the wireline interface 846 can send information to a data aggregation system (e.g., the main controller 730 of FIG. 7) and receive control information (e.g., software updates) from the data aggregation system, via the local or wide area network. In some implementations, a sensor device can be equipped with either or both of the communication interfaces. The wireline interface 846 can allow the example sensor device 800 to exploit existing wireline communication infrastructure (e.g., in a building) and large transmission capacity of wireline communications (e.g., large bandwidth provided by optical network, advanced digital subscriber line technologies, etc.). The wireless interface 832 can enhance the mobility and flexibility of the example sensor device 800 such that it can deliver information at a variety of locations and times, using Bluetooth, WiFi, cellular, satellite, or other wireless communication technologies. In some example implementations, when wireless communication is used with the wireless interface 832, the wireless communication may implement signals in a bandwidth distinct from a bandwidth in which signals are used for detecting motion.

In some implementations, the wireless interface 832 and the RF interface 812 can share hardware or software components (or both). In some implementations, the wireless interface 832 and the RF interface 812 can be implemented separately. In some implementations, the RF interface 812 is mainly responsible for signal reception rather than transmission, and the RF interface 812 can be implemented with specialized lower-power circuitry and thus reduce the overall power consumption of the sensor device 800.

The power management subsystem 820 can include circuits and software for providing and managing power to the sensor device 800. In some implementations, the power management subsystem 820 can include a battery interface and one or more batteries (e.g., rechargeable batteries, a smart battery with an embedded microprocessor, or a different type of internal power source). The battery interface may be coupled to a regulator, which may assist the battery in providing direct current electrical power to the sensor device 800. As such, the sensor device 800 can include a self-contained power supply and can be used at arbitrary locations without need for other external energy sources. Additionally or alternatively, the power management subsystem 820 can include an external power interface that receives power from an external source (e.g., an alternating current power source, an adapter, a converter, etc.). As such, the sensor device 800 can be plugged into an external energy source.

In some implementations, the power management subsystem 820 can oversee and manage power consumption of the sensor device 800. For example, the power management subsystem 820 can monitor the power consumption of the RF interface 812, communication interfaces, the CPU 840, and other components of the sensor device 800, and report the power consumption state of the sensor device 800, for example, to a central controller. In some implementations, the sensor device 800 can be designed to have low power consumption and the power management subsystem 820 can be configured to send an alert to the central controller or intervene with the operations of the sensor device 800 if the power consumption exceeds a threshold. The power management subsystem 820 can include additional or different features.

The CPU 840 can include one or more processors or another type of data-processing apparatus that can execute instructions, for example, to manage the operations of the sensor device 800. The CPU 840 may perform or manage one or more of the operations of a sensor device described with respect to FIGS. 2A, 2B, 3, 4, 5A and 5B. In some implementations, the CPU 840 can be part of the signal analysis subsystem 830. For example, the CPU 840 can process and otherwise analyze the information relating to a received signal or relating to motion detection. In some cases, the CPU 840 can execute or interpret software, scripts, programs, functions, executables, or other modules contained in the memory 850.

The input/output interface 842 can be coupled to input/output devices (e.g., a USB flash drive, a display, a keyboard, or other input/output devices). The input/output interface 842 can assist data transfer between the sensor device 800 and the external storage or display device, for example, over communication links such as a serial link, a parallel link, a wireless link (e.g., infrared, radio frequency, or others), or another type of link.

The memory 850 can include, for example, a random access memory (RAM), a storage device (e.g., a writable read-only memory (ROM) or others), a hard disk, or another type of storage medium. The memory 850 can store instructions (e.g., computer code) associated with operations of the sensor device 800, a main controller, and other components in a sensor device. The memory 850 can also store application data and data objects that can be interpreted by one or more applications or virtual machines running on the sensor device 800. The memory 850 can store, for example, location data, environment data, and state data of the sensor device 800, movement detection data, and other data.

In some implementations, the sensor device 800 can be programmed or updated (e.g., reprogrammed) by loading a program from another source (e.g., from a central controller through a data network, a CD-ROM, or another computer device in another manner). In some instances, the central controller pushes software updates to the sensor device 800 as the updates become available, according to a predetermined schedule, or in another manner.

Figure 9:
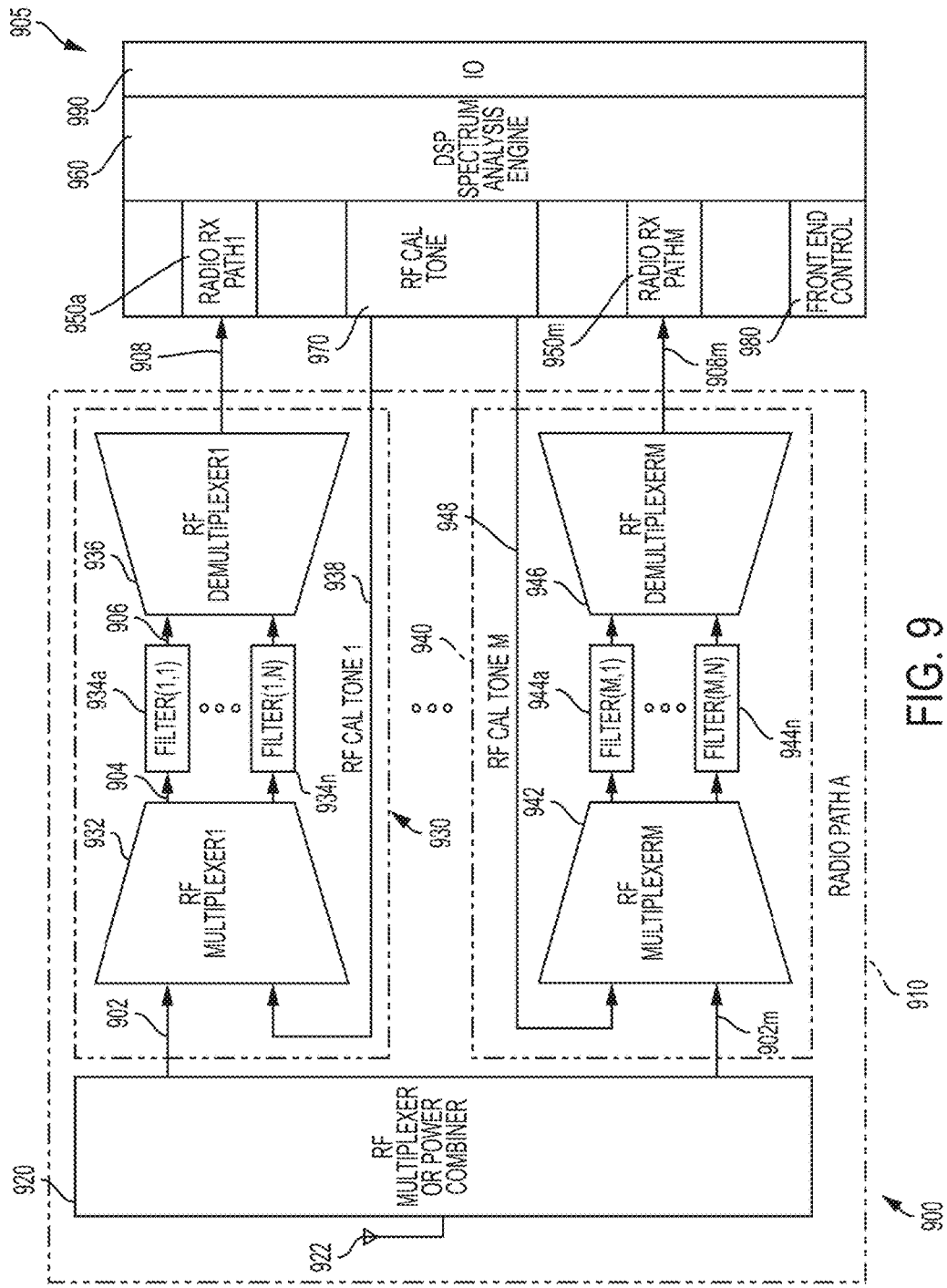
FIG. 9 is a block diagram showing an example signal path.

FIG. 9 is a block diagram showing an example signal path 900. The example signal path 900 includes an RF interface 910 (e.g., denoted as Radio Path A) and a spectrum analysis subsystem 905. The RF interface 812 of the sensor device 800 of FIG. 8 can be implemented as the example RF interface 910 in FIG. 9 or in another manner. The SI subsystem 830 of the sensor device 800 of FIG. 8 can be implemented as the example spectrum analysis subsystem 905 in FIG. 9 or in another manner. In some cases, the signal path 900 can perform all operations for monitoring and detecting movement. For example, the signal path 900 can perform functions of a wireless receiver such as demodulation, etc. The signal path 900 can support signal reception of various wireless communication standards and access the spectrum analysis subsystem 905 for detecting movement.

In the example shown, the RF interface 910 can include a wideband or narrowband front-end chipset for detecting and processing RF signals. For example, the RF interface 910 can be configured to detect RF signals in a wide spectrum of one or more frequency bands, or a narrow spectrum within a specific frequency band of a wireless communication standard. In some implementations, an signal path 900 can include one or more RF interfaces 910 to cover the spectrum of interest. Example implementations of such an signal path are described with respect to FIG. 8.

In the example shown in FIG. 9, the RF interface 910 includes one or more antennas 922, an RF multiplexer 920 or power combiner (e.g., an RF switch), and one or more signal processing paths (e.g., "path 1" 930, . . . , "path M" 940). The antenna 922 can be implemented, for example, as a multi-port antenna or single-port antenna. The antenna 922 can include an omnidirectional antenna, a directional antenna, or a combination of one or more of each. The example antenna 922 is connected to an RF multiplexer 920. In some implementations, the RF interface 910 can be configured to use the one or more antennas 922 for detecting the RF signals based on single-input single-output (SISO), single-input and multiple-output (SIMO), multiple-input and single-output (MISO) or multiple-input and multiple-output (MIMO) technologies.

In some implementations, an RF signal in the local environment of an sensor device can be picked up by the antenna 922 and input into the RF multiplexer 920. Depending on the frequency of the RF signal, the signal 902 output from the RF multiplexer 920 can be routed to one of the processing paths (i.e., "path 1" 930, . . . , "path M" 940). Here M is an integer. Each path can include a distinct frequency band. For example, "path 1" 930 may be used for RF signals between 1 GHz and 1.5 GHz, while "path M" may be used for RF signals between 5 GHz and 6 GHz. The multiple processing paths may have a respective central frequency and bandwidth. The bandwidths of the multiple processing paths can be the same or different. The frequency bands of two adjacent processing paths can be overlapping or disjointed. In some implementations, the frequency bands of the processing paths can be allocated or otherwise configured based on the assigned frequency bands of different wireless communication standards (e.g., GSM, LTE, WiFi, etc.). For example, it can be configured such that each processing path is responsible for detecting RF signals of a particular wireless communication standard. As an example, "path 1" 930 may be used for detecting LTE signals while the "path M" 940 may be used for detecting WiFi signals.

Each processing path (e.g., "processing path 1" 930, "processing path M" 940) can include one or more RF passive and RF active elements. For example, the processing path can include an RF multiplexer, one or more filters, an RF de-multiplexer, an RF amplifier, and other components. In some implementations, the signals 902, 902m output from the RF multiplexer 920 can be applied to a multiplexer in a processing path (e.g., "RF multiplexer 1" 932, . . . , "RF multiplexer M" 942). For example, if "processing path 1" 930 is selected as the processing path for the signal 902, the signal 902 can be fed into "RF multiplexer 1" 932. The RF multiplexer can choose between the signal 902 coming from the first RF multiplexer 920 or the RF calibration (cal) tone 938 provided by the spectrum analysis subsystem 905. The output signal 904 of "RF multiplexer 1" 932 can go to one of the filters, Filter(1,1) 934a, . . . , Filter (1,N) 934n, where N is an integer. The filters further divide the frequency band of the processing path into a narrower band of interest. For example, "Filter(1,1)" 934a can be applied to the signal 904 to produce a filtered signal 906, and the filtered signal 906 can be applied to "RF de-multiplexer 1" 936. In some instances, the signal 906 can be amplified in the RF de-multiplexer. The amplified signal 908 can then be input into the spectrum analysis subsystem 905.

Similarly, if "processing path M" 940 is selected as the processing path for the signal 902m, the signal 902m can be fed into "RF multiplexer M" 942. The RF multiplexer can choose between the signal 902m coming from the first RF multiplexer 920 or the RF calibration (cal) tone 948 provided by the spectrum analysis subsystem 905. The output signal of "RF multiplexer M" 942 can go to one of the filters, Filter(M,1) 944a, . . . , Filter (M,N) 944n, where N is an integer. In some instances, the output signal of the filters can be amplified in the RF de-multiplexer M 946. The amplified signal 908m can then be input into the spectrum analysis subsystem 905.

The spectrum analysis subsystem 905 can be configured to convert the detected RF signals into digital signals and perform digital signal processing to detect movement based on the detected RF signals. The spectrum analysis subsystem 905 can include one or more radio receive (RX) paths (e.g., "radio RX path 1" 950a, "radio RX path M" 950m), a DSP spectrum analysis engine 960, an RF calibration (cal) tone generator 970, a front end control module 980, and an I/O 990. The spectrum analysis subsystem 705 may include additional or different components and features.

In the example shown, the amplified signal 908 is input into "radio RX path 1" 950a, which down-converts the signal 908 into a baseband signal and applies gain. The down-converted signal can then be digitalized via an analog-to-digital converter. The digitized signal can be input into the DSP spectrum analysis engine 960. In some example implementations, the DSP spectrum analysis engine 960 is implemented as one or more processors, which can include programmable logic (like a field programmable gate array (FPGA) with a core instantiated thereon), a general purpose processor configured to execute program code instructions, an application specific integrated circuit (ASIC), the like, or a combination thereof. The DSP spectrum analysis engine 960 can, for example, transform the digitized baseband signal into a Fourier transformed signal, which may be performed using an FFT algorithm. The FFT algorithm can produce complex values representing the respective frequency components, which may indicate a magnitude and phase offset of the baseband signal at the respective frequency components, for example, as described above with respect to FIGS. 2A and 2B.

In some example implementations, the DSP spectrum analysis engine 960 can output the complex values representing the frequency components. The output (e.g., the complex numbers) of the DSP spectrum analysis engine 960 can be applied and formatted to the I/O 990, for example, for transmission to another processor, such as the CPU 840 of FIG. 8. The CPU 840 can then store the complex values in memory 850, such as a buffer, cache, or the like, for comparison with subsequently determined complex values. The CPU 840 can then compare complex values from a first time period to complex values of a subsequent time period, and when the numbers are different by an amount that exceeds a threshold, the CPU 840 can detect that movement has occurred. The CPU 840 can additionally compare the complex values, or the differences between complex values, with a signature that is stored in memory 850. If a match is identified using the signature, the CPU 840 can identify the detected movement. An indication of detected movement, and in some examples, the identification of the movement, can be communicated from the CPU 840 through the wireless interface 832 or wireline interface 846 as discussed above in FIG. 8. In other example implementations, the DSP spectrum analysis engine 960 or another processor may perform one or more of the operations discussed as being performed by the CPU 840.

Additionally, for other radio paths, a digitized signal can be input into the DSP spectrum analysis engine 960, and the DSP spectrum analysis engine 960 can, for example, identify packets and frames included in the digital signal, read preambles, headers, or other control information embedded in the digital signal (e.g., based on specifications of a wireless communication standard) to identify various source devices (which may implement communications using Bluetooth, WiFi or other wireless communications). This information may be output from the DSP spectrum analysis engine 960 and formatted to the I/O 990, for example, for transmission to the data aggregation system via one or more communication interfaces of the sensor device. This information can be used to determine how many and which devices are within an environment in which the sensor device is located.

The RF calibration (cal) tone generator 970 can generate RF calibration (cal) tones for diagnosing and calibration of the radio RX paths (e.g., "radio RX path 1" 950a, . . . "radio RX path M" 950m). The radio RX paths can be calibrated, for example, for linearity and bandwidth.

In a general aspect of some of the examples described, wireless signals are used to detect movement in a space.

A first example is a motion detection process. At a wireless sensor device in a space and at a first time, a first received wireless signal based on a first transmission of a transmitted wireless signal is received. The first transmission is transmitted by a source device. By operation of a processor, a first characteristic of frequency components in a bandwidth of a first signal is determined. The first signal is based on the first received wireless signal. At the wireless sensor device and at a second, later time, a second received wireless signal based on a second transmission of the transmitted wireless signal is received. The second transmission is transmitted by the source device. By operation of the processor, a second characteristic of frequency components in the bandwidth of a second signal is determined. The second signal is based on the second received wireless signal. Movement of an object in the space is detected based on a comparison between the first characteristic and the second characteristic.

Implementations of the first example may, in some cases, include one or more of the following features. The space may be an enclosed space, and the source device can reside in the enclosed space. Determining the first characteristic and the second characteristic may include transforming, respectively, the first signal and the second signal to a frequency domain, and the first characteristic and the second characteristic may include a first set and a second set, respectively, of complex values representing magnitudes and phases of the frequency components in the bandwidth of the first signal and the second signal, respectively. Detecting the movement may include detecting that a difference between the first characteristic and the second characteristic exceeds a threshold. The transmitted wireless signal may be a transmitted radio-frequency (RF) wireless signal. The source device may comprise a second wireless sensor device in the space. A first set and a second set of complex values may be determined from the first received wireless signal and the second received wireless signal, respectively, and movement of the object based on a difference between the first set of complex values and the second set of complex values may be detected. The difference between the first set of complex values and the second set of complex values can include at least one of a difference in phase or a difference in amplitude for one or more of the frequency components. The first received wireless signal and the second received wireless signal can be filtered to generate a first output signal and a second output signal, respectively, and the first output signal and the second output signal can be down-converted to generate the first signal and the second signal, respectively.

A second example is a motion detection process. Wireless signals based on a wireless transmission repeated by a source are received at a wireless sensor device in a space. The received wireless signals are analyzed, by operation of a processor, to detect movement of objects in the space. The analysis includes determining complex values representing magnitudes and phases of respective frequency components of each of the received wireless signals, and detecting movement of an object in the space based on a change in the complex values.

Implementations of the second example may, in some cases, include one or more of the following features. Movement may be detected when the change exceeds a threshold value. Determining the complex values may include using a Fast Fourier Transform (FFT) algorithm. The wireless transmission may include a wireless radio frequency (RF) signal.

A third example is a motion detection system. The motion detection system includes a source device and a sensor device. The source device is operable to transmit a transmitted wireless signal repeatedly. The sensor device is operable to receive wireless RF signals based on the transmitted wireless signal that is transmitted multiple times. The sensor device has a processor configured to determine complex values representing magnitudes and phases of frequency components of respective signals based on the received wireless RF signals. The sensor device has a processor configured to detect motion of an object based on a comparison of the complex values.

Implementations of the third example may, in some cases, include one or more of the following features. The source device and the sensor device may be a same device. The processor may be configured to determine the complex values using a Fast Fourier Transform (FFT) algorithm. The processor may be configured to detect motion of the object when a difference between at least two of the complex values exceeds a threshold value. The sensor device may include a radio path and down-conversion circuitry, and the radio path can include a filter. The sensor device can be configured to input electronic signals of the received wireless RF signals to the radio path, and an output of the radio path may be coupled to an input of the down-conversion circuitry. The down-conversion circuitry may be operable to down-convert a RF signal to a baseband signal, and the down-conversion circuitry may be operable to output the respective signals based on the received wireless RF signals.

While this specification contains many details, these should not be construed as limitations on the scope of what may be claimed, but rather as descriptions of features specific to particular examples. Certain features that are described in this specification in the context of separate implementations can also be combined. Conversely, various features that are described in the context of a single implementation can also be implemented in multiple embodiments separately or in any suitable subcombination.

A number of embodiments have been described. Nevertheless, it will be understood that various modifications can be made. Accordingly, other embodiments are within the scope of the following claims.

What is claimed is:

1. A motion detection method comprising:
receiving, at a wireless sensor device in a space and at a first time, a first received wireless signal based on a first transmission of a transmitted wireless signal, the first transmission being transmitted by a source device;
determining, by operation of a processor, a first characteristic of frequency components in a bandwidth of a first signal, the first characteristic comprising a first set of complex values for the frequency components in the bandwidth of the first signal, the first signal being based on the first received wireless signal;
receiving, at the wireless sensor device and at a second, later time, a second received wireless signal based on a second transmission of the transmitted wireless signal, the second transmission being transmitted by the source device;
determining, by operation of the processor, a second characteristic of frequency components in the bandwidth of a second signal, the second characteristic comprising a second set of complex values for the frequency components in the bandwidth of the second signal, the second signal being based on the second received wireless signal; and
detecting movement of an object in the space based on a comparison between the first characteristic and the second characteristic.

2. The motion detection method of claim 1, wherein the space comprises an enclosed space, and the source device resides in the enclosed space.

3. The motion detection method of claim 1, wherein determining the first characteristic and the second characteristic comprises transforming, respectively, the first signal and the second signal to a frequency domain, the first set of complex values represents magnitudes and phases of the frequency components in the bandwidth of the first signal, and the second set of complex values represents magnitudes and phases of the frequency components in the bandwidth of the second signal.

4. The motion detection method of claim 1, wherein detecting movement comprises detecting that a difference between the first characteristic and the second characteristic exceeds a threshold.

5. The motion detection method of claim 1, wherein the transmitted wireless signal is a transmitted radio-frequency (RF) wireless signal.

6. The motion detection method of claim 1, wherein the source device comprises a second wireless sensor device in the space.

7. The motion detection method of claim 1, wherein detecting movement of an object in the space based on the comparison between the first characteristic and the second characteristic comprises:
detecting movement of the object based on a difference between the first set of complex values and the second set of complex values.

8. The motion detection method of claim 7, wherein the difference comprises at least one of a difference in phase or a difference in amplitude for one or more of the frequency components.

9. The motion detection method of claim 1 further comprising:
filtering the first received wireless signal to generate a first output signal;
down-converting the first output signal to generate the first signal;
filtering the second received wireless signal to generate a second output signal; and
down-converting the second output signal to generate the second signal.

10. A motion detection method comprising:
at a wireless sensor device in a space, receiving wireless signals based on a wireless transmission repeated by a source;
analyzing, by operation of a processor, the received wireless signals to detect movement of an object in the space, the analysis comprising:
determining complex values for respective frequency components of each of the received wireless signals; and
detecting movement of an object in the space based on a change in the complex values.

11. The motion detection method of claim 10, wherein movement is detected when the change exceeds a threshold value.

12. The motion detection method of claim 10, wherein determining the complex values comprises using a Fast Fourier Transform (FFT) algorithm.

13. The motion detection method of claim 10, wherein the wireless transmission comprises a wireless radio frequency (RF) signal.

14. A motion detection system comprising:
a sensor device configured to detect movement of an object in a space, the sensor device comprising:
an antenna system configured to receive wireless signals in the space, the received wireless signals based on repeated transmissions of a transmitted wireless signal from a source device; and
one or more processors configured to:
determine complex values for frequency components of respective signals based on the received wireless signals; and
detect motion of the object based on a comparison of the complex values.

15. The motion detection system of claim 14, wherein the one or more processors are configured to determine the complex values using a Fast Fourier Transform (FFT) algorithm.

16. The motion detection system of claim 14, wherein the one or more processors are configured to detect motion of the object when a difference between complex values exceeds a threshold value.

17. The motion detection system of claim 14, wherein the sensor device comprises a radio path and down-conversion circuitry, the radio path comprising a filter, the sensor device being configured to input electronic signals of the received wireless RF signals to the radio path, an output of the radio path being coupled to an input of the down-conversion circuitry, the down-conversion circuitry being configured to down-convert a RF signal to a baseband signal, the down-conversion circuitry being configured to output the respective signals based on the received wireless RF signals.

18. The motion detection system of claim 14, further comprising a source device configured to transmit the repeated transmissions.

19. The motion detection system of claim 14, wherein the sensor device further comprises a source device configured to transmit the repeated transmissions.

20. The motion detection system of claim 14, further comprising a data analysis system configured to receive information related to motion detection from the sensor device.

* * * * *